Figure 1:
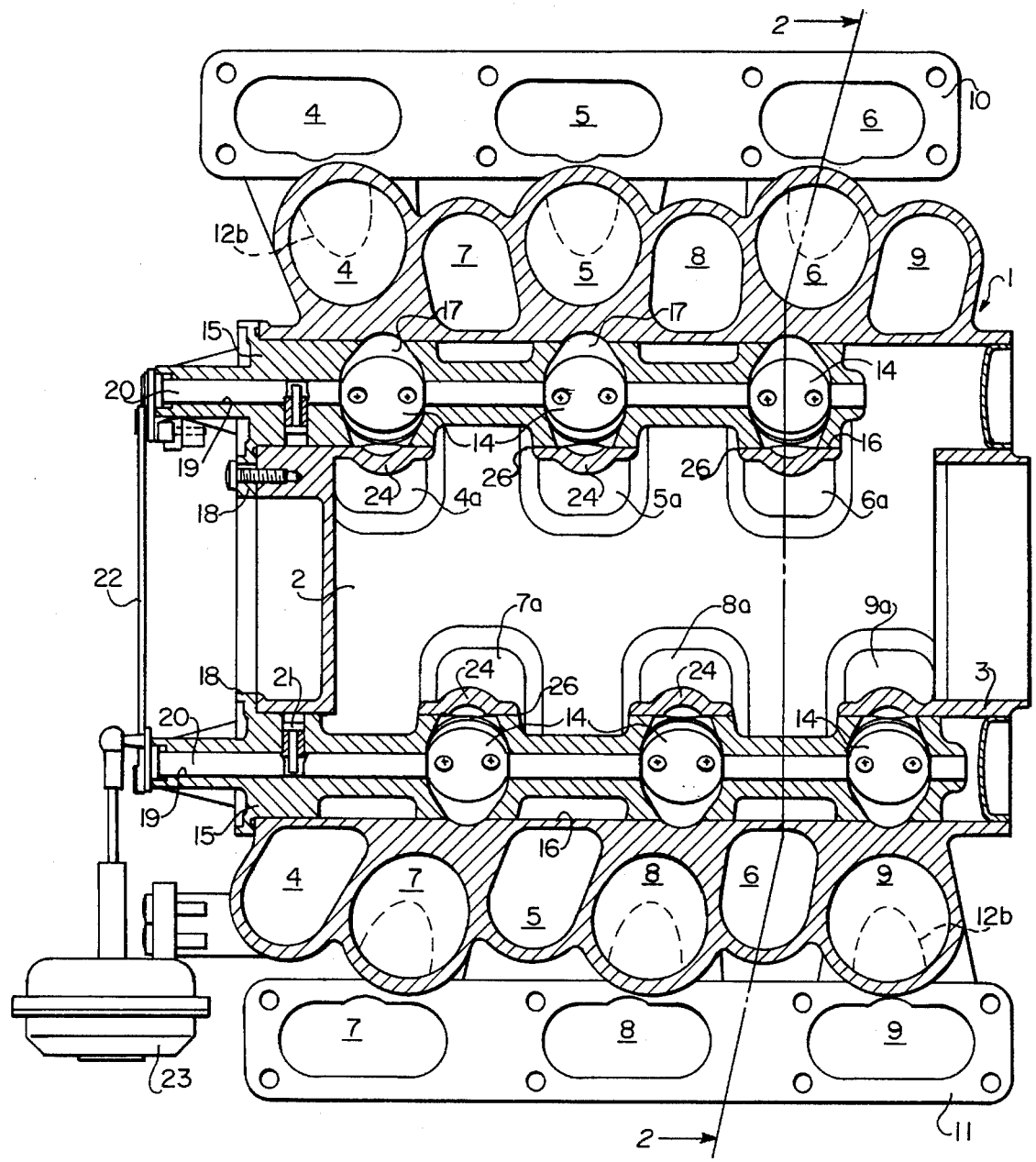

United States Patent [19]

Ohrnberger

[11] Patent Number: 5,492,088
[45] Date of Patent: Feb. 20, 1996

[54] INTAKE PIPE SYSTEM FOR A MULTICYLINDER INTERNAL COMBUSTION ENGINE

[75] Inventor: Gerd Ohrnberger, Neudenau, Germany

[73] Assignee: Audi AG, Ingolstadt, Germany

[21] Appl. No.: 392,775

[22] PCT Filed: Jun. 25, 1993

[86] PCT No.: PCT/EP93/01631

§ 371 Date: Apr. 13, 1995

§ 102(e) Date: Apr. 13, 1995

[87] PCT Pub. No.: WO94/04803

PCT Pub. Date: Mar. 3, 1994

[30] Foreign Application Priority Data

Aug. 26, 1992 [DE] Germany .................. 42 28 334.5

[51] Int. Cl.⁶ .................................................. F02B 27/02
[52] U.S. Cl. .................. 123/184.34; 123/184.55
[58] Field of Search ................ 123/184.24, 184.34, 123/184.42, 184.46, 184.52, 184.53, 184.55, 184.56

[56] References Cited

U.S. PATENT DOCUMENTS

| | | | |
|---|---|---|---|
| 4,664,076 | 5/1987 | Miyano et al. | 123/184.55 |
| 4,671,217 | 6/1987 | Hitomi et al. | 123/184.53 |
| 4,726,329 | 2/1988 | Atkin | 123/184.34 |
| 4,854,271 | 8/1989 | Miyano et al. | 123/184.55 |
| 4,932,369 | 6/1990 | Parr | 123/184.55 |
| 5,033,417 | 7/1991 | Van Basshuysen et al. | 123/184.55 |
| 5,267,543 | 12/1993 | Novak et al. | 123/184.52 |

FOREIGN PATENT DOCUMENTS

| | | |
|---|---|---|
| 0177794 | 9/1985 | European Pat. Off. . |
| 0215628 | 9/1986 | European Pat. Off. . |
| 0337816 | 4/1989 | European Pat. Off. . |

*Primary Examiner*—Marguerite Macy
*Attorney, Agent, or Firm*—Lalos & Keegan

[57] ABSTRACT

An intake pipe system for a multicylinder internal combustion engine, in particular one with two cylinder banks arranged to form a V, has a tubular intake distributor 2 from which extends a first set of individual intake pipes 4 to 9 which extend through an arc around the intake distributor and lead to the individual cylinders of the two cylinder banks. A second set of shorter individual intake pipes also extend from the intake distributor and discharge into the associated individual intake pipes. The intake distributor and the first and second sets of individual intake pipes are made up of an integral casting 1 having a longitudinal bore 16 intersecting the second set of individual intake pipes. There is introduced into each longitudinal bore 16 a casing having openings 17 aligned with the second set of individual intake pipes, in which bore a pivoting valve 14 is mounted on a common shaft 20 which is embedded in the casing 15.

5 Claims, 2 Drawing Sheets

INTAKE PIPE SYSTEM FOR A MULTICYLINDER INTERNAL COMBUSTION ENGINE

DESCRIPTION

The invention relates to an intake pipe system for a multicylinder internal combustion engine.

In one state-of-the-art intake pipe system of this type (EP-B 0177794, FIGS. 4 and 5) the individual intake pipes are combined with an intake distributor to form a single unit on which the intake distributor is flange-mounted as a separate component, this intake distributor communicating on one side with the intake manifold by way of a throttle valve element and on the other with the individual intake pipes. The pivoting valves for the second set of intake pipes are mounted on shafts which extend through the intake distributor. This state-of-the-art intake pipe system is relatively costly to manufacture and creates problems from the viewpoint of reliable interaction of the pivoting valves mounted in the intake distributor with the second set of individual intake pipes mounted in another component.

The object of the invention is to create a generic intake pipe system which is characterized by simplicity of structure and accordingly more cost-effective manufacture and which ensures reliable interaction of the pivoting valves with the second set of individual intake pipes.

Production is simplified by the circumstance that the intake distributor and the individual intake pipes are made up of an integral casting and the offsets that are virtually unavoidable in the joining of two castings because of the process tolerances are eliminated. Since the pivoting valves are mounted in a single casing that must be inserted only into the longitudinal bore in the casting intersecting the second intake pipe, reliable operation of the pivoting valves in conjunction with the second set of individual intake pipes is ensured, and in addition the possibility is provided of premounting the pivoting valves for the second set of intake pipes for all cylinders of a bank of cylinders. This presents the particular advantage that the shaft bearing the pivoting valves is mounted in the casing and not, as is the case with the state-of-the-art design, in the intake distributor on two points situated a relatively great distance from each other.

In order to reduce the space required for installation it is advisable for the intake distributor to be tubular and for the first set of intake pipes to extend through an arc greater than 270° around the intake distributor and for every other individual intake pipe to extend radially relative to the associated first individual intake pipe on the inside over a partial area of the latter and to have a common wall with this area and end in the first individual intake pipe near the end of the latter on the cylinder side. The longitudinal bore is preferably mounted so that it intersects the second set of individual intake pipes near its junction with the first set of individual intake pipes.

This design is especially well suited for an internal combustion engine with two V-mounted cylinder banks, the individual intake pipes associated with the cylinders of the first cylinder bank extending clockwise and the individual intake pipes associated with the second cylinder bank extending counterclockwise around the intake distributor, and in the longitudinal direction of the intake distributor a first and a second individual intake pipe following a first and a second individual intake pipe for a cylinder of the second cylinder bank. A first longitudinal bore intersecting the second set of individual intake pipes for the cylinders of the first cylinder bank and a second longitudinal bore intersecting the second set of individual intake pipes for the cylinders of the second cylinder bank for the cylinders of the second cylinder bank are here provided, into each of which is introduced a casing with apertures, and into the latter pivoting valves mounted on a shaft are inserted. These two shafts are connected to each other in a state-of-the-art arrangement for common rotation.

In order to inhibit as little as possible the process of intake into the second set of individual intake pipes, it is advisable to interrupt the sections of the casting between adjacent second individual intake pipes that contain the longitudinal bores and to design one casing in the area of these gaps with a cross-section that is smaller in the areas in which the openings with pivoting valves are provided.

Figure 2:
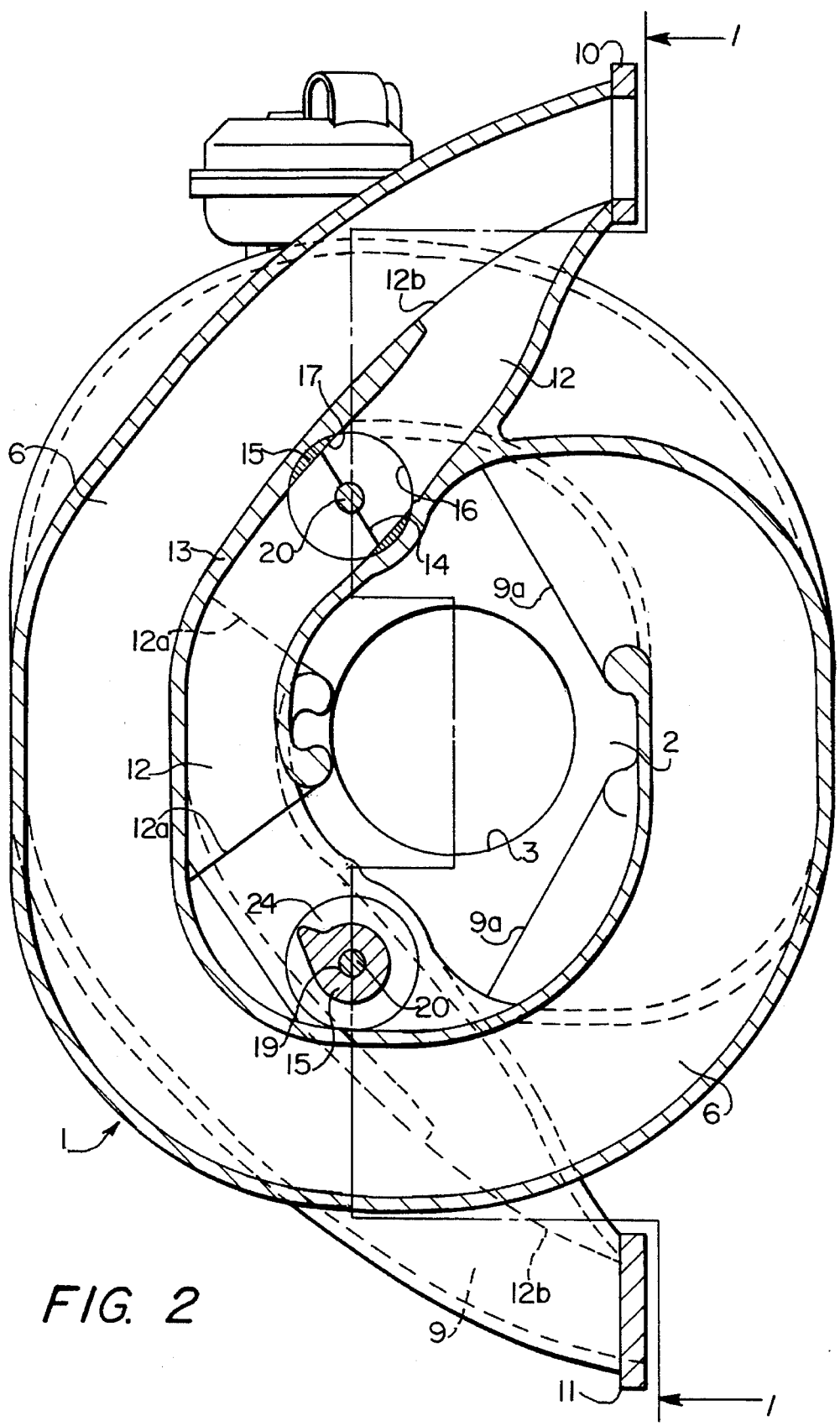

One example of embodiment of the invention in the form of an intake pipe system for a V-6 internal combustion engine is described in what follows with reference to the drawings, in which FIG. 1 shows a longitudinal section of the intake pipe system along line 1—1 in FIG. 2, and FIG. 2 and cross-section along line 2—2 in FIG. 1.

The intake pipe system illustrated in the drawings is designed for a V-6 internal combustion engine for mounting between the cylinder banks each of which contains three cylinders. This system has an integral casting 1 containing a central tubular intake distributor 2 that is connected through an opening 3 in the right wall of the casting 1 to a throttle valve component not shown. Extending from the intake distributor 2 are a first set of individual intake pipes 4, 5, 6 for the cylinders of the first cylinder bank and a first set of individual intake pipes 7, 8, 9 for the cylinders of the second cylinder bank. The first set of individual intake pipes 4 to 9 are mounted side by side and, as is to be seen from FIG. 2, extend around the intake distributor 2, the first set of individual intake pipes 4, 5, and 6 in Figure two extending counterclockwise and the first set of individual intake pipes 7, 8, and 9 extending clockwise. The intake openings of the first set of individual intake pipes 4 to 9 are identified as 4a to 9a. The first set of individual intake pipes 4 to 6 end in a flange 10 mounted on the cylinder head of the first cylinder bank, while the first set of individual intake pipes 7, 8, and 9 end in a flange 11 bolted to the cylinder head of the other cylinder bank.

Mounted radially inside each of the first set of individual intake pipes 4 to 9 is a second individual intake pipe 12 which also emerges from the intake distributor 2 and whose intake opening is designated as 12a and which ends at 12b in the associated first individual intake pipe, as is to be seen from FIG. 2. The second set of individual intake pipes 12 extend parallel to the associated first set of individual intake pipes and in the same direction as the latter and have a common wall 13 with the latter.

In every other individual intake pipe 12 there is mounted a pivoting valve 14 which closes off the second individual intake pipe 12 in a lower engine speed range, so that only the long first set of individual intake pipes 6 to 9 are active. In the upper engine speed range the pivoting valves 14 are pivoted to their open position, as a result of which in essence only the short second set of individual intake pipes are active and, because of their lower flow resistance, increase the charging rate and thus the efficiency of the internal combustion engine.

For the purpose of mounting the pivoting valves 14 for the second set of individual intake pipes 12 associated with the first set of individual intake pipes 4 to 6 and 7 to 9, which lead to the cylinders of a cylinder bank, there is provided a more or less cylindrical casing 15 which extends through a cylindrical bore 16 in the casting 1 which intersects the second set of individual intake pipes 12. The casing 15 is provided with openings 17 which are aligned with the second set of individual intake pipes and in each of which a pivoting valve 14 is mounted. At its left end as shown in FIG. 1 each casing 15 has a through bore 19 through which extends a shaft 20 on which the pivoting valves are fastened. Each of the shafts 20 is axially immobilized in its casing by a pin 21 but is rotatable through a specific angle. The two shafts 20 are connected to each other by a rod assembly 22 and are rotated simultaneously by a pneumatic motor operator 23.

Mounting the pivoting valves 14 associated with a cylinder bank in the casing 15 permits preassembly and adjustment of the pivoting valves 14, so that all that is required for mounting the intake pipe system is insertion of the two casings 15 with the premounted pivoting valves 14 into the bores 16 in the casting 1 and immobilization of the two casings.

The sections 24 of the casting 1 receiving the casings 15 are force fitted in the intake distributor 2. In order to prevent disruption thereby of the process of intake into the second set of individual intake pipes, these areas between the individual intake pipes 12 are interrupted, and each casing 15 is designed with a smaller diameter in the area of these gaps 26 than in the areas in which the pivoting valves 14 are mounted. Consequently, as is to be seen from FIG. 1, each casing 15 in essence extends only through the area of the second set of individual intake pipes 12 in section 24 of the casting 1.

The invention is not restricted exclusively to an intake pipe system for an internal combustion engine with two V-mounted cylinder banks; it may also be applied to an intake pipe system for an internal combustion engine with only one cylinder bank. The first set of individual intake pipes 7, 8, and 9 and the associated second set of individual intake pipes with their valves are, of course, omitted in this instance.

I claim:

1. An intake pipe system for a multicylinder internal combustion engine, with
   an intake distributor (2),
   a first set of individual intake pipes (4 to 9) positioned side by side and extending from the intake distributor and each leading to a cylinder,
   a set of shorter second individual intake pipes (12) extending from the intake distributor (2) and each ending in a first individual intake pipe, and
   pivoting valves (14) for blocking or clearing the second set of individual intake pipes,
   wherein the intake distributor (2) and the first and second sets of individual intake pipes (6 to 9 and 12) are made up of an integral casting (1) having a longitudinal bore (16) intersecting the second set of individual intake pipes (12), and wherein there is introduced into this longitudinal bore a casing (15) having a central through bore (19) and openings (17) aligned with the second set of individual intake pipes (12), in each of which openings a pivoting valve (14) is mounted on a shaft (20) extending through the through bore (19).

2. An intake pipe system as claimed in claim 1, wherein the intake distributor (2) is tubular, the first set of individual intake pipes (4 to 9) extend through an arc of more than 270° around the intake distributor, every other individual intake pipe extends parallel to the associated first individual intake pipe radially inside which it extends and has with it a common wall (13) and ends in the first individual intake pipe near the end of the first individual intake pipe on the cylinder side.

3. An intake pipe system as claimed in claim 1 or claim 2, wherein the longitudinal bore (16) intersects the second set of individual intake pipes (12) near their junction with the first set of individual intake pipes.

4. An intake pipe system as claimed in claims 1 or 2 for an internal combustion engine with two cylinder banks arranged in the form of a V, wherein the individual intake pipes associated with the first cylinder bank extend clockwise, and those associated with the second cylinder bank counterclockwise, around the intake distributor (2) and in the longitudinal direction of the intake distributor a first and a second individual intake pipe for a cylinder of the first cylinder bank follow a first and a second individual intake pipe for a cylinder of the second cylinder bank, and wherein a first longitudinal bore (16) intersecting the second set of individual intake pipes for the cylinders of the first cylinder bank and a second longitudinal bore (12) intersecting the second set of individual intake pipes (12) for the cylinders of the second cylinder bank are provided, into each of which bore there is inserted a casing (15) with openings (17) and there are inserted into these openings pivoting valves (14) mounted on a shaft (20), and wherein the two shafts (20) are interconnected for rotation in common.

5. An intake pipe system as claimed in claim 4, wherein the sections (24) of the casting (1) between adjacent second individual intake pipes (12) are interrupted, and wherein each casing (15) has a smaller diameter in the area of these gaps (26) than in the areas in which the openings (17) with pivoting valves (14) are provided.

* * * * *